United States Patent [19]

Stine et al.

[11] 4,194,536

[45] Mar. 25, 1980

[54] COMPOSITE TUBING PRODUCT

[75] Inventors: Clifford R. Stine, Solon; Rudolph G. Wojtecki, Mantua, both of Ohio

[73] Assignee: Eaton Corporation, Cleveland, Ohio

[21] Appl. No.: 909,786

[22] Filed: May 26, 1978

Related U.S. Application Data

[63] Continuation of Ser. No. 749,055, Dec. 9, 1976, abandoned.

[51] Int. Cl.² .......................... F16L 11/12; H05B 3/58
[52] U.S. Cl. ........................................ 138/149; 138/33; 138/103; 138/111; 219/301; 219/528; 165/136; 165/164
[58] Field of Search ............... 138/111, 140, 149, 103, 138/33; 165/136, 164, 172, 185; 219/301, 528, 530, 535

[56] References Cited

U.S. PATENT DOCUMENTS

| | | | |
|---|---|---|---|
| 332,258 | 12/1885 | Lamkin | 138/149 |
| 417,768 | 12/1889 | Bartlett | 138/149 |
| 3,012,923 | 12/1961 | Sloyter | 138/149 X |
| 3,315,703 | 4/1967 | Matthews et al. | 138/111 |
| 3,522,413 | 8/1970 | Chrow | 138/33 X |
| 3,529,632 | 9/1970 | Johns | 138/111 |
| 3,548,158 | 12/1970 | McCaskell | 138/33 X |
| 3,554,237 | 1/1971 | Pelley et al. | 138/149 X |
| 3,687,170 | 8/1972 | Malone et al. | 138/149 X |
| 3,727,029 | 4/1973 | Chrow | 219/301 |
| 3,853,149 | 12/1974 | Stine | 138/111 |
| 3,904,394 | 9/1975 | Prast et al. | 138/111 X |
| 3,955,601 | 5/1976 | Plummer | 138/149 |
| 3,986,341 | 10/1976 | Dehaan | 138/127 X |

FOREIGN PATENT DOCUMENTS 649014   8/1937   Fed. Rep. of Germany ........... 138/111

Primary Examiner—Richard E. Aegerter
Assistant Examiner—James E. Bryant, III
Attorney, Agent, or Firm—R. J. McCloskey; A. E. Chrow

[57] ABSTRACT

Elongate, deformable, composite tubing for use in maintaining or controlling the temperature of a fluid conveyed therethrough comprising one or more tubular fluid conveyance lines or one or more tubular fluid conveyance lines disposed in heat transfer relationship with one or more heating lines and having disposed in encompassing relationship thereabout an improved flexible thermal barrier. The improved thermal barrier comprises one or more flexible, flame resistant, low chlorine bearing, sheet-like layers of low bulk fibrous glass elements having a density of less than about 20 lb./cu. ft. providing improved thermal insulation characteristics in combination with improved flexibility and reduced outer diameter.

34 Claims, 16 Drawing Figures

COMPOSITE TUBING PRODUCT

This is a continuation of application Ser. No. 749,055 filed Dec. 9, 1976, now abandoned.

This invention relates in general to elongate, deformable composite tubing and more particularly to elongate, deformable composite tubing adapted for use in conveyance of a fluid from one point to another while maintaining or controlling the temperature of the conveyed fluid.

BACKGROUND OF THE INVENTION

Deformable composite tubing comprising one or more tubular fluid conveyance lines or one or more tubular fluid conveyance lines disposed in heat transfer relationship to one or more heating lines having a thermal barrier disposed in encompassing relationship thereabout for maintenance or control of the conveyed fluid temperature is well known in the prior art. Such composite tubing may be used, for example, by the Chemical Processing Industry for maintaining or controlling the temperature of a fluid conveyed from a process line to a sampling or control instrument for the monitoring of selected properties such as viscosity or molecular weight. In many cases, accuracy of the measurements being taken may be adversely influenced when the temperature of the conveyed fluid is permitted to change during its course of travel from the process line to the sampling or control instrument. Other uses for such composite tubing may be, for example, the prevention of freezing or the heating of the conveyed fluid during its course of travel through the tubular fluid conveyance line of the composite tubing. Thermal barriers disposed about such deformable composite tubing provides a means of reducing costly energy loss which has lately become of increased importance in view of recent national and international energy conservation programs. Composite tubing of the nature described has been disclosed in U.S. Pat. No. 3,269,422 in which the thermal barrier is described as a Dacron-asbestos laminate or a pre-formed or cast expanded foam material. U.S. Pat. No. 3,315,703 also teaches that the insulating barrier or thermo barrier layer may be a laminated Dacron-asbestos and U.S. Pat. No. 3,355,572 describes the flexible thermo barrier layer of insulating material as a flexible cellular plastic or insulating tape. U.S. Pat. Nos. 3,522,413 and 3,727,029 teach other embodiments of composite tubing products without further defining thermal barriers over the prior art heretofore described. U.S. Pat. No. 3,853,149 teaches the use of rope-like organic and inorganic fibrous elements of high bulk and low density for use as thermal insulation and U.S. Pat. No. 2,578,280 merely describes a flexible insulation covering as being used as a binding mechanism.

Products made in accordance with the aforesaid patent references, however, provide certain undesirable characteristics such as low tear strength, increased stiffness, low moisture resistance, high chlorine content and low thermal efficiency associated with Dacron-asbestos laminates or high bulk, high compressibility, high deformation, enlargened diameter, lower melt or softening (with subsequent deformation) and poor flame resistance normally associated with foamed plastic insulations or high bulk and enlarged diameters associated with rope-like organic and inorganic insulations.

SUMMARY OF THE INVENTION

It is an object of this invention to provide improved elongate, deformable composite tubing adapted for the conveyance of fluids therethrough. It is a further object to provide improved elongate, deformable composite tubing for the conveyance of fluid that is thermally insulated from the surrounding environment. It is still a further object to provide improved elongate deformable composite tubing that is adapted to influence, maintain or control the temperature of a fluid conveyed therethrough. It is a further object to provide elongate, deformable composite tubing comprising one or more tubular fluid conveyance line means encompassed by an improved thermal barrier. It is yet another object to provide elongate, deformable composite tubing comprising one or more tubular fluid conveyance lines disposed in heat transfer relationship with one or more heating lines encompassed by a thermal barrier that provides improved heat insulating characteristics in combination with improved flexibility and reduced outer diameter. It is still a further object to provide elongate, deformable composite tubing having one or more tubular fluid conveyance lines or one or more tubular fluid conveyance lines disposed in heat transfer relationship with one or more heating lines wherein said line means are encompassed by a flame resistant thermal barrier comprising one or more flexible low chlorine bearing, sheet-like layers of low bulk, low density fibrous glass elements providing improved heat insulating characteristics in combination with improved flexibility and reduced outer diameter. It is yet a further object to provide elongate, deformable composite tubing comprising one or more tubular fluid conveyance lines or one or more tubular fluid conveyance lines disposed in heat transfer relationship with one or more heating line means wherein said line means are encompassed by a thermal barrier comprising one or more flexible, flame resistant, low chlorine bearing, sheet-like layers or low bulk, low density fibrous glass elements providing substantial retention of thermal insulation quality under radially compressed conditions in combination with improved flexibility and reduced outer diameter.

DESCRIPTION OF THE PREFERRED EMBODIMENTS

Figure 1:
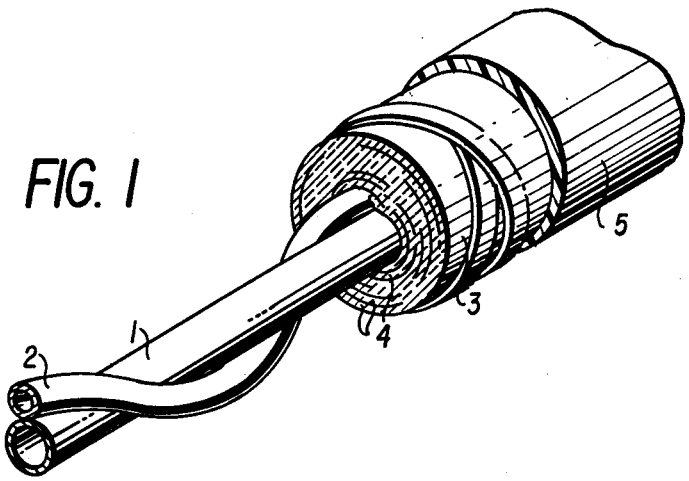
FIG. 1 is a generally perspective, fragmentary view, partially cut-away, showing one embodiment of deformable composite tubing made in accordance with the invention.
Figure 2:
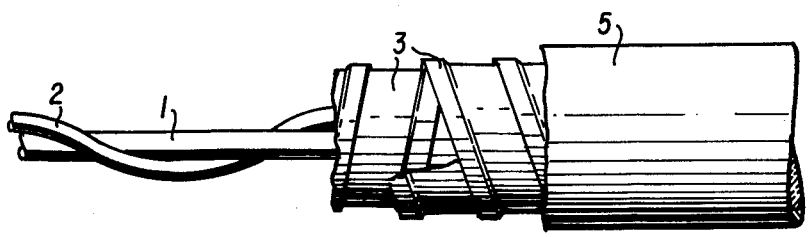
FIG. 2 is a side elevation, fragmentary view, partially cut-away, showing the deformable composite tubing of FIG. 1.

Referring now again to the drawings, and in particular to FIGS. 1 and 2 thereof, there is shown a tubular fluid conveyance line 1 having tubular heating line 2 disposed thereabout in contiguous spiral heat transfer relationship. In the example shown, heating line 2 may be used, for example, for the conveyance of steam, warm or cold water, or other fluids that may be used to provide a source of heating or cooling depending upon the effect desired on a fluid conveyed through fluid conveyance line 1. Tubular fluid conveyance line 1 and heating line 2 may be made from either metallic or polymeric materials such as, for example, polytetrafluoroethylene or fluorinated ethylene propylene. Preferably, tubular fluid conveyance line 1 is made from a suitable stainless steel and heating line 2 is made from a suitable copper alloy. Tubular fluid conveyance line 1 may be used as a heating line and line 2 may be used, if desired, for tubular fluid conveyance line 1. It is also to be understood that the line means shown may be in parallel heat transfer relationship and is not limited to the contiguous spiral heat transfer relationship shown. Disposed in encompassing relationship about tubular fluid conveyance line 1 and heating line 2 is thermal barrier 3 comprising one or more flexible, flame resistant, low chlorine bearing, sheet-like layers 4 of low bulk, low density fibrous glass elements encompassed by outer protective covering 5. Although the embodiment shown in FIGS. 1 and 2 depicts layers 4 as being spirally wound and having adjacent parallel edges in abutting relationship, they may be wound wherein adjacent edges of layer 4 provide a spaced apart or an overlapping relationship. Although not shown in the figures, it is preferred that successive radially adjacent layers 4 of the invention be helically wound in opposite directions with respect to the central longitudinal axis of composite tubing of the invention. It is also preferred to provide oppositely wound successive radially adjacent layers for other spirally wound barrier members where used for composite tubing of the invention. Layers 4 may also be, in part or whole, applied in a longitudinal overlapping manner such as shown, for example, in FIG. 12. Layers 4 may also be applied in a longitudinal manner having adjacent edges in a spaced apart or abutting relationship or in combination of spirally wound and longitudinal applications having adjacent edges in overlapping, spaced apart and/or abutting relationship.

Figure 3:
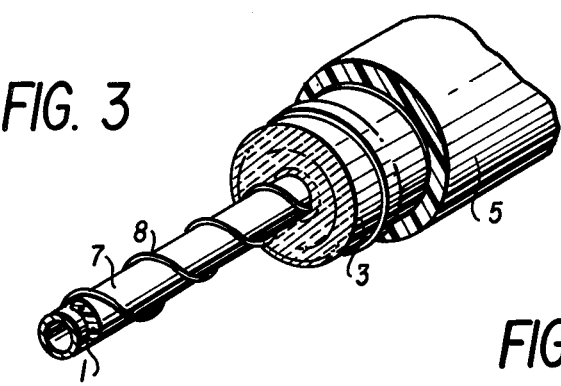
FIG. 3 is a generally perspective, fragmentary view, partially cut-away, showing another embodiment of deformable composite tubing made in accordance with the invention.

FIG. 3 shows electrical heating line 7 disposed in heat transfer relationship with tubular fluid conveyance line 1 and held in contact relationship therewith by means of binder member 8 disposed about lines 1 and 7. Disposed about line 1, line 7 and binder member 8 is improved thermal barrier 3 of the invention encompassed by protective covering 5. Electrical heating line 7 may be, for example, a semi-conductive heating member such as disclosed in U.S. Pat. No. 3,861,029 or a constant wattage heating member comprising a pair of elongate, substantially parallel spaced-apart electrical conductor members having high resistance heating elements, such as nichrome wire, electrically connecting the conductor pair in spaced arrangement along the longitudinal length thereof. Although heating line 7 is shown as parallel to tubular fluid conveyance line 1, the heating member may instead be spirally wound about tubular fluid conveyance line 1, where it is suitable to do so.

Figure 4:
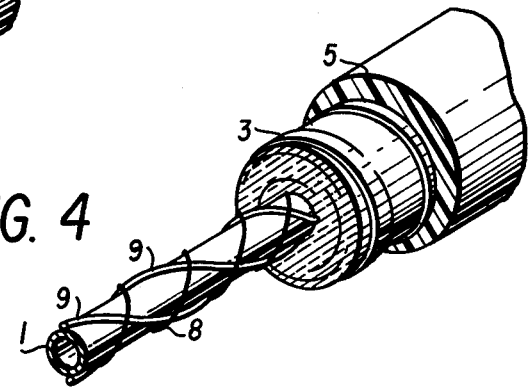
FIG. 4 is a generally perspective, fragmentary view, partially cut-away, showing still another embodiment of deformable composite tubing made in accordance with the invention.
Figure 6:
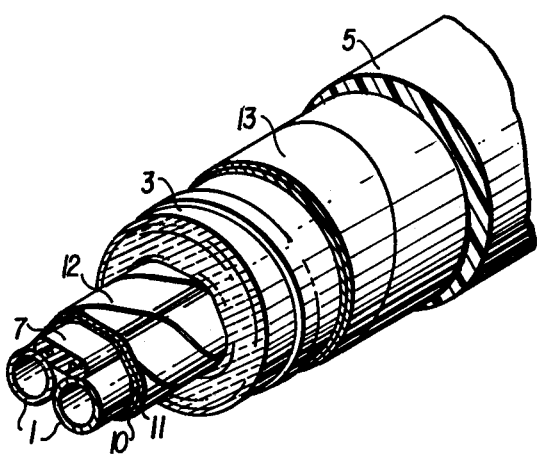
FIG. 6 is a generally perspective, fragmentary view, partially cut-away, showing still another embodiment of FIG. 7 is a generally perspective, fragmentary view, partially cut-away, showing yet another form of deformable composite tubing made in accordance with the invention.

FIG. 4 shows another embodiment of electrical heating means wherein heating line 9 is comprised of a pair of insulated high resistance electrical conductors 9 disposed in spiral heat transfer relationship with tubular fluid conveyance line 1. Disposed about conductors 9 and line 1 is binder member 8 which is preferably used to hold conductors 9 and line 1 in contiguous contact relationship. Disposed about conductors 9, line 1 and binder member 8 is improved thermal barrier 3 of the invention encompassed by outer protective covering 5. Member 8 as shown, for example, in FIGS. 3, 4 and 7 may also be used to bind electrical heating lines such as line 7 of FIGS. 3 and 4 to tubular fluid conveyance line 1. Member 8 may be a fibrous material such as a fibrous reinforcement strand made from an aromatic poly mide or it may be a polymeric material such as poly(ethylene) terrephthalate fiber such as Mylar film sold by E. I. Du Pont de Nemours. Member 8 may also be metallic material such as metallic film, or a metal-polymeric laminate such as member 12 comprised of layers 10 and 11 as shown in FIG. 6. In the latter case it is preferred to have the metallic portion of such laminates in contact relationship with both the heating line and fluid conveyance line such that member 12 provides a means of more uniformly distributing heat derived from the heating line as well as providing a binding function.

Figure 5:
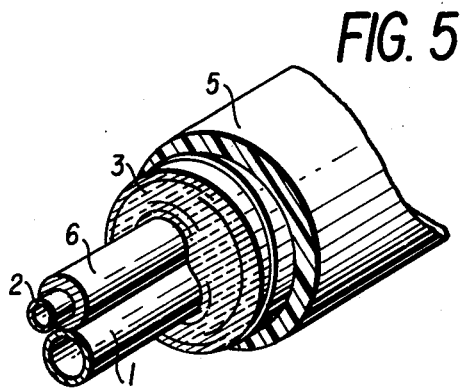
FIG. 5 is a generally perspective, fragmentary view, partially cut-away, showing another embodiment of deformable composite tubing made in accordance with the invention.

FIG. 5 illustrates an embodiment of the invention wherein heating line 2 is spaced apart from tubular fluid conveyance line 1 by means of separation member 6 disposed in encompassing relationship about tubular fluid conveyance line 1 and having improved thermal barrier 3 of the invention encompassed by protective covering 5 disposed thereabout. Such separation means can be employed as a means of further controlling the temperature gradient between fluid conveyance line 1 and heating line 2. Such separation may be accomplished, for example, by wrapping or coating line 2 with a suitable barrier material such as, for example, the fibrous glass elements of the invention, or providing spaced separation members along the axial length thereof, and the like. It is to be understood that such separation means may also be employed in relation to tubular fluid conveyance line 1 or, depending upon requirements, for both tubular fluid conveyance line 1 and heating line 2. It is to be further understood that separation barriers such as shown and described in FIG. 5 may also be employed in relation to electrical heating line means and is not limited to tubular heating line 2 and that, although the lines are shown in contiguous parallel heat transfer relationship, they, and all embodiments of the invention, may be disposed in contiguous spiral heat transfer relationship where suitable to do so.

Figure 9:
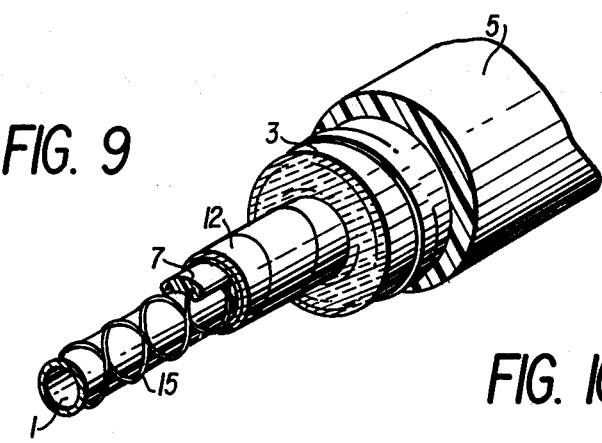
FIG. 9 is a generally perspective, fragmentary view, partially cut-away showing yet another form of deformable composite tubing made in accordance with the invention.
Figure 12:
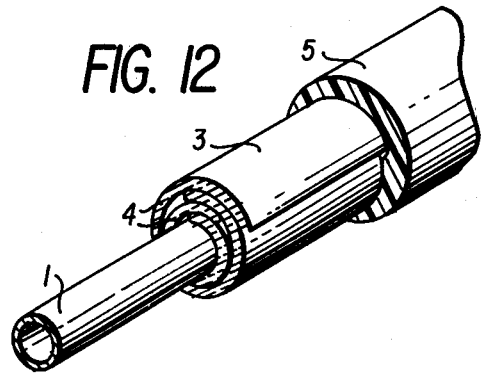
FIG. 12 is a generally perspective, fragmentary view, partially cut-away, showing yet another modified form of deformable composite tubing made in accordance with the invention.
Figure 13:
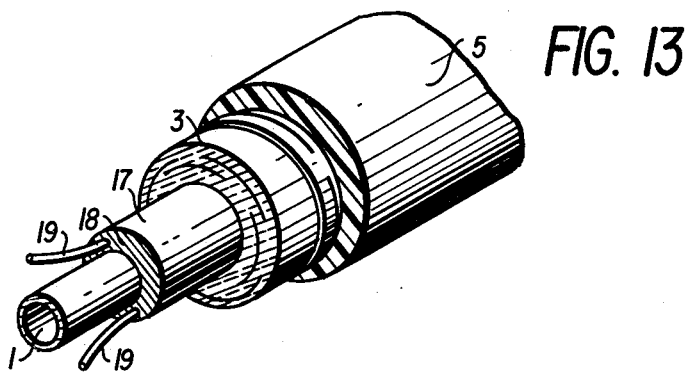
FIG. 13 is a generally perspective, fragmentary view, partially cut-away, showing still another embodiment of deformable composite tubing made in accordance with the invention.

FIG. 6 shows further embodiment variations wherein member 12, which may be a metallic material such as a metal film, metallic laminate such as a glass-metal laminate, or a metallic-polymeric laminate and the like, is disposed in encompassing relationship about tubular fluid conveyance lines 1 and heating line 7. In the case of metal laminates such as a metal-polymeric laminate, it is preferred to have the metal portion 11 thereof in contact heat transfer relationship to the encompassed members and polymeric portion 10 disposed radially external to member 11. Also shown in FIG. 6 is improved thermal barrier 3 of the invention disposed about member 12 and member 13 disposed between thermal barrier 3 and protective covering 5. Member 13 may be a form of film or tape made from polymeric, metallic, metallic laminate such as a glass-metal laminate or a metal-polymeric laminate and the like materials for use as mechanical protection and/or barrier means such as may be required for improved resistance to water and other chemicals. Member 13 may also be a form of strand-like reinforcement made, for example, from metallic, glass-like, synthetic fibrous and the like materials that may be applied by such means, for example, as braiding, helically winding, weaving, knitting and the like. As in the case of thermal barrier 3, members such as 12, shown in FIGS. 9 and 12, and 13, shown in FIG. 5, may be applied in a longitudinal manner rather than in the spiral fashion shown. As in all embodiments, it is preferred to provide a protective covering thereabout such as, for example, protective covering member 5 disposed about barrier 13 of FIG. 5. Protective covering member 5 may be made of a thermoplastic material such as polyvinyl chloride, polyethylene, thermoplastic, rubber, nylon, polyurethane or the like, or it may be made from cross-linkable materials such as rubber or other materials that may be suitably cross-linked by chemical or irradiation means. Although not shown in the drawings, it is considered within the scope of this invention to provide further mechanical protection means such as, for example, by disposing an armour-like sheath such as spirally wound metallic strands, interlocked annular-like metallic members or continuous convoluted metal and the like in place of, within or about said covering member 5. It is to be further understood that although lines 1 and line 7 are shown in contiguous parallel heat transfer relationship, that such lines, including variations described above, may be disposed in contiguous spiral heat transfer relationship when suitable to do so.

Figure 7:
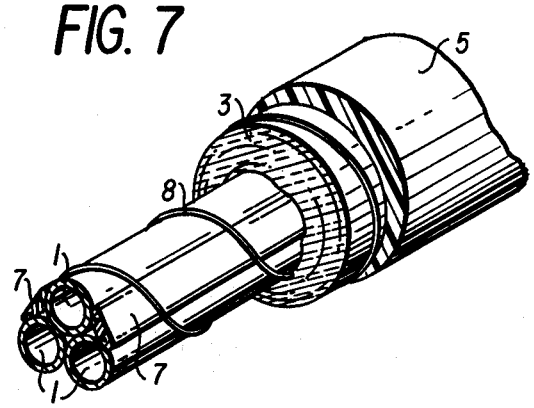

FIG. 7 shows an embodiment of the invention having a plurality of tubular fluid conveyance lines 1 disposed in heat transfer relationship to a plurality of heating line members such as electrical heating lines 7, binder member 8 disposed about lines 1 and 7 and improved thermal barrier 3 of the invention encompassed by protective covering 5 disposed about lines 1, 7 and member 8. Although not shown, a plurality of tubular heating lines, such as member 2 shown in FIG. 1, may be used in place of electrical heating line 7 and, as in all embodiments of the invention, such lines are not limited to contiguous parallel heat transfer relationship as shown but may be disposed in contiguous spiral heat transfer relationship where suitable to do so.

Figure 8:
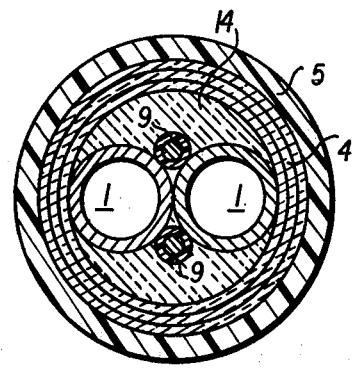
FIG. 8 is a cross-sectional view showing another form of deformable composite tubing made in accordance with the invention.

FIG. 8 shows another form of the invention wherein filler member 14 may be disposed about tubular fluid conveyance lines 1 and heating line means such as electrical heating line 9 as shown. Disposed about lines 1, 9 and filler member 14 is thermal barrier 3 of the invention encompassed by protective covering 5. The filler may be made, for example, from tow, strand-like, particulate, fibrous, foam-like, organic, inorganic and the like materials and may be used for geometrical, heat conducting or insulating purposes. Although not shown in the drawing, it is to be understood that composite tubing of the invention having filler, such as filler member 14 shown in FIG. 8, may further incorporate additional members such as, for example, binder member 8, member 12 and/or member 13 as hereinbefore described. It is to be further understood that composite tubing of the invention having filler, such as member 14, is not limited to having electrical heating means 9, as shown in FIG. 8, but may have, in replacement thereof, one or more tubular fluid conveyance lines disposed in heat transfer relationship with one or more tubular or electrical heating lines such as, for example, electrical heating line 7 as shown in FIGS. 3, 6, 7 and 9 and line 17 as shown in FIG. 13.

FIG. 9 illustrates another form of the invention wherein tubular fluid line 1 may have a reinforcing material, such as fibrous strands 15 disposed thereabout for improvement of its strength. Although fluid conveyance line 1 and reinforcement strands 15 may be made from metallic or polymeric materials, it is preferred in this embodiment that tubular fluid conveyance line 1 be made from a fluorocarbonated material such as, for example, polytetrafluoroethylene, fluorinated ethylene-propylene, perfluoroalkoxy, poly-vinylidene fluoride, ethylene-polytetrafluoroethylene copolymer and the like, and reinforcement strands 15 be made, for example, from a fibrous glass or a synthetic fibrous material such as aromatic polyamide, sold under the tradename of Nomex or Kevlar by E. I. Du Pont de Nemours. Also shown in FIG. 9, is electrical heating line 7 disposed in heat transfer relationship with tubular fluid conveyance line 1 encompassed by member 12 hereinbefore described. Disposed about member 12 is thermal barrier 3 of the invention encompassed by protective covering 5. For the embodiment shown in FIG. 9, it is preferred that member 12 be a metallic-polymeric laminate such as copper-Mylar wherein the copper portion is in contacting relationship with members 1 and 7.

Figure 10:
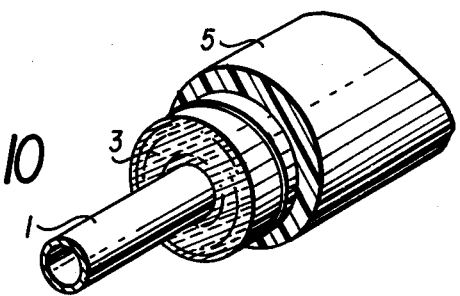
FIG. 10 is a generally perspective, fragmentary view, partially cut-away, of still another form of deformable composite tubing made in accordance with the invention.

FIG. 10 illustrates another embodiment wherein only tubular fluid conveyance line 1 is included in deformable composite tubing made in accordance with the invention. Disposed about line 1 is thermal barrier 3 of the invention encompassed by protective covering 5. It is to be understood that the design shown in FIG. 6 is for descriptive purpose only and that such designs, not having heating line means, may include a plurality of tubular fluid conveyance lines and may further include filler member 14 such as shown in FIG. 8 and/or binding member 12 and/or barrier member 13 as shown, for example, in FIG. 6 and additional thermal barrier such as shown, for example, as member 16 in FIG. 11.

Figure 11:
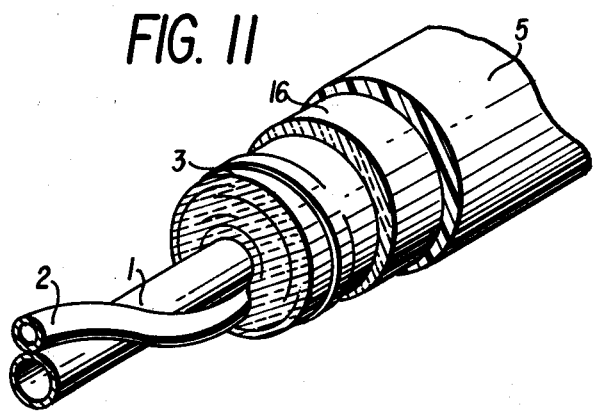
FIG. 11 is a generally perspective, fragmentary view, partially cut-away, showing a modified form of deformable composite tubing made in accordance with the invention.

FIG. 11 shows another embodiment of the invention wherein an additional thermal barrier 16 [not comprising one or more vlexible, flame resistant, low chlorine bearing, sheet-like layers of low bulk, low density fibrous glass elements] is disposed in encompassing relationship about thermal barrier 3 of the invention. In the embodiment shown, tubular heating line 2 is spirally wound about fluid conveyance line 1, improved thermal barrier 3 of the invention is disposed about lines 1 and 2 and additional thermal barrier 16 is disposed between thermal barrier 3 and protective covering 5. Suitable materials for use in such additional thermal barriers may be, for example, polymeric foam, rope-like organic or inorganic materials, asbestos tape, polymeric-asbestos laminates, particulate coatings and the like. Thermal barrier 16 may also be located radially internal to thermal barrier 3, where required, or located both radially external and radially internal to thermal barrier 3, depending upon design requirements. As in previous examples, a barrier, such as member 13 of FIG. 6, may be disposed between thermal barrier 3 and additional thermal barrier 16 or between additional thermal barrier 16 and outer covering 5, or both, depending upon thermal design requirements. It is to be understood that composite tubing of the invention having additional thermal barriers such as member 16, shown in FIG. 11, is not limited thereto and may include variations thereof such as, for example, having a plurality of tubular fluid conveyance lines; having a plurality of tubular heating lines; having a plurality of tubular fluid conveyance and tubular heating lines; providing for substitution of one or more electrical heating lines for the tubular heating lines of the above, providing for the inclusion of filler members, binding members and/or protective members such as members 8, 12, 13 and 14 hereinbefore described and providing for the lines being disoosed in contiguous parallel heat transfer relationship instead of the spiral relationship shown.

FIG. 12 illustrates yet another embodiment of the invention wherein fluid conveyance line 1 is encompassed by longitudinally applied thermal barrier 3 of the invention and protective covering 5 is disposed about thermal barrier 3. Such design is shown for purpose of illustrating longitudinally applied layers 4 of thermal barrier 3 and it is to be understood that design variations thereof may be provided such as, for example, as hereinbefore described for FIG. 10.

FIG. 13 illustrates yet another embodiment of the invention, wherein electrical heating line 17, disposed in heat transfer relationship about tubular fluid conveyance line 1, comprises semi-conductive coating 18 having electrically conductive members 19 embedded therein. Semi-conductive coating 18 may be made, for example, from a polymeric material containing suitable amounts of dispersed carbon black, metallic particles or combinations thereof. Disposed about heating line 17 is thermal barrier 3 of the invention encompassed by protective covering 5. Composite tubing of the invention may include a plurality of such tubular fluid conveyance lines 1 encompassed by electrical heating line 17 which may be disposed in contiguous parallel or spiral heat transfer relationship when suitable and may include additional elements such as members 8, 12, 13 and 16, hereinbefore described, depending upon thermal design requirements. It is to be further understood that heating line 17 may contain a plurality of electrically conductive member 19 and is not limited to the pair shown in FIG. 13.

Figure 14:
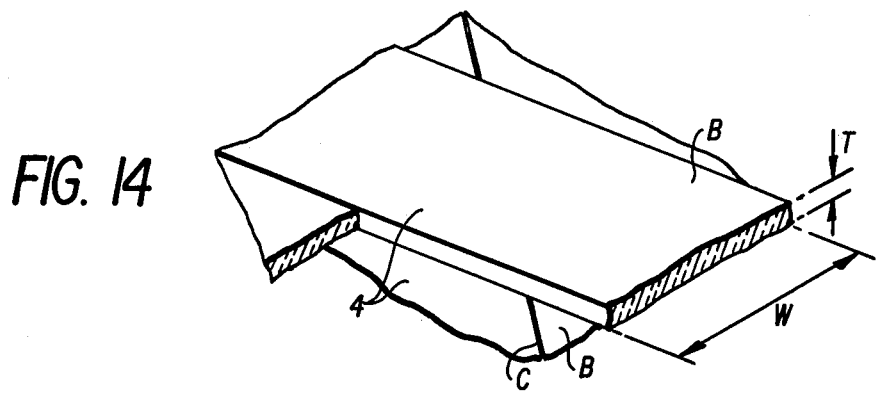
FIG. 14 is a generally perspective, fragmentary schematic view showing geometrical aspects of a thermal barrier layer used in deformable composite tubing made in accordance with the invention.
Figure 15:
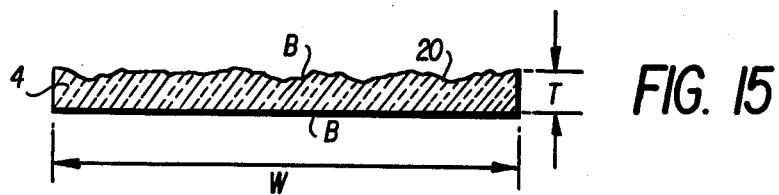
FIG. 15 is a schematic cross-sectional view showing another form of a thermal barrier used in deformable composite tubing made in accordance with the invention.
Figure 16:
FIG. 16 is a schematic cross-sectional view showing yet another form of a thermal barrier layer used in deformable composite tubing made in accordance with the invention.

FIGS. 14, 15 and 16 illustrate geometrical characteristics of layers 4 used in thermal barrier 3 of the invention. It has been found that thermal barrier 3, having one or more layers 4, of the invention, hereinbefore described, provides several unexpected advantages. One advantage found, is a substantial retention of thermal insulation quality even though layers 4 are generally present, in composite tubing of the invention, in a radially compressed form. Such compressed form generally results from tensions placed upon layers 4 and from compressive forces related to components added radially external to thermal barrier 3 during the process of making composite tubing of the invention such as, for example, barrier 13 or outer covering 5 of FIG. 6 and the like. It is believed, by use of flexible, flame resistant, low chlorine bearing, sheet-like layers of low bulk, low density fibrous glass elements, that a substantial amount of air is entrapped within and between said layers during the process of making composite tubing made in accordance with the invention. Such air entrapment is believed to provide a substantial retention of thermal insulation quality, expressed as thermal conductivity factor [K], under the radially compressed form of layers 4 generally present in composite tubing of the invention. The ability to provide good thermal insulating quality under radially compressed conditions has resulted in significantly reduced outer diameters and resultant lowering of the weight of composite tubing made in accordance with the invention. Another advantage found is improved flexibility. The improved flexibility is believed to result from reduced outer diameter and improved air entrapment, as described above, in combination with improved thermal barrier 3 of the invention being comprised of one or more flexible, sheet-like, low bulk layers 4, herein before described, wherein a plurality of said layers 4 are free for relative movement between radially adjacent, contacting layer surfaces, which are, herein defined as those surfaces of layer 4 which face either radially inwardly towards the central longitudinal axis c of composite of the invention or which face radially outwardly away from said central longitudinal axis. Such surfaces are shown in FIGS. 14, 15 and 16 as reference B. Because of the use of a plurality intersurface relationship between layers that provide freedom for multiple relative movements and thereby reduces t.ie force necessary to deform composite tubing of the invention, similar as, for example, to the functon of leaf springs used in automotive suspension systems.

Another advantage found is wherein layers 4, normally having been radially compressed in composite tubing of the invention additionally provides a firmness to said thermal barrier 3 wherein resistance to radial deformation is decreased while still providing substantial retention of thermal insulation quality, reduced diameters and improved flexibility. Such advantage is desirable, for example, in preventing thermal barrier wall distortions, such as kinking or wrinkling, when subjecting the composite tubing to small bending radii or flattening that may occur, for example, in areas where the composite tubing may be clamped for supportive purposes.

FIG. 14 shows a typical portion of layer 4 having a width W, thickness T and surface B, which may face inwardly or outwardly from the central longitudinal axis C of composite tubing of the invention, depending upon the orientation taken in application of the sheet-like layer 4 during the process of making said composite tubing. In the example shown, both said surfaces are substantially smooth.

FIGS. 15 and 16 show preferred embodiments of layer 4 wherein one or both surfaces B of the flexible, sheet-like layers of fibrous glass elements has an undulated or roughened surface portion 20. The presence of such an undulated surface portion 20 is believed to further enhance entrapment of air for thermal insulation improvement and reduces friction between radially adjacent contacting layer surfaces as a means of permitting greater relative movement between layers during deformation as hereinbefore described. It is believed that layers 4 having an udulated surface 20 on one side thereof may result from one of the methods of making such layers which comprises depositing fibrous glass elements of the invention having a liquid-like resinous binder onto a substantially smooth porous surface and evacuating volatile liquids therefrom thru the porous surface such as the surface of layer 4 adjacent to the porous surface remains substantially smooth and the surface of layer 4 opposite to the adjacent surface attains an undulated or roughened appearance. Although it is preferred that all of said layers 4 have an undulated or roughened surface, on one side thereof, facing either radially inwardly or radially outwardly from the central axis of composite tubing of the invention, they may have undulated or roughened surfaces on both sides and thermal barrier B of the invention may comprise combinations of layers and having the above described surface characteristics. Width W, of sheet-like layer 4, shown in FIGS. 14, 15 and 16, may be of any value suitable for making composite tubing of the invention. Generally, width W is between ¼ inch and 4 inches and preferably from ¼ inch to about 2 inches. Thickness T of layer 4 measured in a radial direction substantially normal to the central longitudinal axis of composite tubing of the invention, shown in FIGS. 14, 15 and 16 may be from about 0.010 inch to about 0.250 inch, dependent upon composite tubing of the invention being made. Preferably thickness T of layer 4 is from about 0.010 inch to about 0.125 inch and more preferably from about 0.025 inch to about 0.075 inch. Although it is preferred that all layers 4 of the invention have substantially equivalent thicknesses, one or more of layers 4 may have thicknesses within the above recited ranges. Width W of layers 4 may be substantially equivalent or may vary between layers such as, for example, width W becoming increasingly larger for layers 4 disposed radially outwardly about layers 4 of lesser width and the like. Another advantage, not shown in the figures, has been found to be an unexpectly high breaking strength of layers 4 in relation to the relative thinness thereof, that permits layers 4 be applied during the composite tube making process with conventional process apparatus such as, for example, tube fold-up guides and tension devices related to longitudinal application of layers 4 or rotary taping heads and tension devices related to spiral winding applications of layers 4. Still another advantage is that sheet-like layer 4 of the invention contains less than about 500 parts by weight of chlorine per one million parts by weight of said layer. Metallic components have been found to corrode and/or stress crack in the presence of chlorine bearing thermal insulations thereby making it desirable to provide relatively low level chlorine content in thermal barrier 3 used in composite tubing of the invention. Although layer 4 contains less than about 500 parts per million of chlorine, as defined above, it is preferred that the layers contain less than about 300 parts per million of chlorine and more preferably less than about 100 parts per million of chlorine for providing a reduced corrosive and stress-cracking environment. Although, the sheet-like, low bulk, low density fibrous glass elements may be woven, knitted or the like, to make layers 4 of the invention, it is preferred that layers 4 comprises fibrous glass elements in a resinous binder such as, for example, a binder made from modified polyvinyl alcohol. The presence of a resinous binder tends to improve handling and flex-fatigue characteristics of fibrous glass elements. Although layers 4 of the invention may have a density of up to about 20 lb. per cu. ft., it is preferred that said layers have a density of less than about 15 lb. per cu. ft. and more preferably less than about 13 lb. per cu. ft. in order to provide the advantages hereinbefore described. It is believed that greater densities would tend to lower insulation quality, decrease air entrapment ability, increase thermal quality loss under radial compression and increase resistance to deformation.

An example of material found suitable for use as layers 4 of thermal barrier 3 of the invention is tile glass matt sheet, sold by Crane and Company and of which following Table 1 tabulates selected properties of interest.

TABLE 1

| Property | Acceptable Value |
| --- | --- |
| Tensile Breaking Strength | 15 lbs./inch - Width [Minimum] |
| Water Soluble Chloride | 100 ppm - Maximum |
| Binder [% by Weight] | 10% Maximum |
| Weight | 4–5 oz./sq. yd. |
| Density | 8.7 lb./Ft.$^3$ Typical |
| Surface | One Side Smooth Opposite Side Roughened [Less Smooth] |
| Thickness | .045" Min. Average .035" Min. Thickness at any point. |
| Width | Variable ± 1/32 " |
| Thermal Conductivity [K Factor] Btu/hr. -Ft.$^2$ - °F. - Ft. | .050 at 400° F. .032 at 100° F. |

The above described material was not known to be suitable for use as thermal insulation in composite tubing of the invention and was limited in its use at the time of the invention, to the making of conventional ceiling tile. Yet another material found suitable for use as a thermal barrier in deformable composite tubing made in accordance with the invention is Beta Glass Sheet, also sold by Crane and Company, and some of whose properties are listed in following Table 2. As in the case of Tile Glass Sheet, Beta Glass Sheet was not known to be suitable for use as thermal insulation in composite tubing of the invention.

TABLE 2

| | |
|---|---|
| Density | 13.6 lb./Ft.$^3$ |
| Thermal Conductivity [K] BTU/hr. -Ft.$^2$ - °F. - Ft. | .051 |
| Water Soluble Chloride | 100 ppm - Maximum |

The significance of density and the advantage of having one or more flexible, flame resistant, low chlorine bearing, sheet-like layers of low bulk, low density fibrous glass elements as a thermal barrier in deformable composite tubing made in accordance with the invention is brought forth by the following example.

CONSTRUCTION: ⅜" O.D. copper tubing spirally wrapped with following listed insulations and having disposed thereabout a first layer of 1 mil mylar spirally wrapped with 50% overlap of adjacent edges and an outer 80 mil layer of extruded Polyvinyl Chloride [PVC] as the outer covering. Mylar-asbestos used in the following example has a thermal conductivity [K] factor estimated to be 0.162 BTU/hr. —Ft.$^2$— °F. —Ft. at 400° F.

TEST: 250 PSIG saturated steam was passed through the bore of the copper tubing and the temperature of the outer surface of the outer covering was measured and recorded by use of J-type thermocouples.

RESULTS:

| INSULATION SYSTEM [2 Inch Wide Tapes-Spirally Wound] | OUTER DIAMETER OF COMPOSITE TUBING | OUTER SURFACE TEMPERATURE OF OUTER PROTECTIVE COVERING [°F.] | AMBIENT [°F.] |
|---|---|---|---|
| ASBESTOS-MYLAR | | | |
| 2 Layers, each .062" Thick with 50% Overlap plus 2 Layers .016" Thick with 50% Overlap | 1.355–1.385 | 225 | 92 |
| TILE GLASS | | | |
| 4 Layers, each .055" Thick with 50% Overlap | 1.34 | 125 | 80 |

Dimensional analysis of the above data brings forth the following points of interest.

1. That the Tile Glass barrier was radially compressed at least 0.018" from its calculated uncompressed state.

2. That the asbestos-mylar barrier was radially expanded at least 0.034" from its calculated unstressed state wherein said expansion is believed to be caused by wrinkling and waviness normally associated with such a tape.

The above illustrates that Tile Glass sheet provides the lowest outer covering surface temperature and the smallest outer diameter in comparison to Mylar-asbestos insulations under conditions of radial compression that would have heretofore been considered detrimental for the substantial retention of thermal insulation quality. It is believed that flexible, flame resistant, low chlorine bearing, sheet-like layers of fibrous glass elements having the unique combination of low bulk and low density provides the ability to entrap air within and between the layers during the process of making composite tubing of the invention resulting in substantial retention of thermal insulation quality under radially compressed conditions. It is also believed that said layers, for reasons hereinbefore recited, have provided a less corrosive thermal barrier in combination with reduced outer diameter, reduced weight and improved flexibility and flame resistance.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. An elongate, deformable, composite tubing product having a central longitudinal axis therethrough and adapted for use in conveying a fluid from one point to another and providing means for maintaining or controlling the temperature of the conveyed fluid, said tubing product comprising; at least one tubular fluid conveyance line means, a plurality of sheet-like layers of flexible, flame resistant, low chlorine bearing, low bulk, fibrous glass elements contained in a resinous binder, each of said layers wound one about the other and around said line means to form a thermal insulating barrier member about said line means, each of said layers having a thickness of from 0.025 to 0.075 inch and a density of less than 20 lb./cu. ft., each of said layers having a chlorine content of less than about 500 parts by weight per million parts by weight of said layer, and each of said layers having at least one undulated surface whereby facing surfaces of the said layers have spaces therebetween which entrap air and contribute to the heat insulating properties of the thermal insulating barrier.

2. The composite tubing of claim 1 having at least one heating line means disposed in heat transfer relationship with said tubular fluid conveyance line means.

3. The composite tubing of claim 1 wherein said resinous binder comprises a modified polyvinyl alcohol.

4. The composite tubing of claim 1 wherein the weight of said resinous binder is less than about 10% by weight of each of said layers.

5. The composite tubing of claim 1 wherein one or more of said sheet-like layers of fibrous glass elements have a substantially smooth surface facing radially inwardly towards said composite tubing central longitudinal axis and an undulated surface facing radially outwardly from said composite tubing central longitudinal axis.

6. The composite tubing of claim 1 wherein one or more of said sheet-like layers of fibrous glass elements have a substantially smooth surface facing radially outwardly from said composite tubing central longitudinal axis and an undulated surface facing radially inwardly towards said composite tubing central longitudinal axis.

7. The composite tubing of claim 1 having a protective outer covering disposed in encompassing relationship about said thermal barrier.

8. The composite tubing of claim 1 wherein said tubular fluid conveyance line means comprises a metallic material.

9. The composite tubing of claim 1 wherein said tubular fluid conveyance line means comprises a polymeric material.

10. The composite tubing of claim 2 wherein said heating line means is a tubular fluid conveyance heating line means.

11. The composite tubing of claim 2 wherein said tubular fluid conveyance heating line means comprises a metallic material.

12. The composite tubing of claim 2 wherein said tubular fluid conveyance heating line means comprises a polymeric material.

13. The composite tubing of claim 2 wherein said heating line means comprises an electrical heating line means.

14. The composite tubing of claim 9 wherein said polymeric material comprises a fluorinated hydrocarbon material.

15. The composite tubing of claim 12 wherein said polymeric material comprises a fluorinated hydrocarbon material.

16. The composite tubing of claim 1 having a binding member disposed between said line means and said thermal barrier and encompassing said line means.

17. The composite tubing of claim 16 wherein said binding member comprises a fibrous material.

18. The composite tubing of claim 16 wherein said binding member comprises a polymeric material.

19. The composite tubing of claim 16 wherein said binding member comprises a laminate having a polymeric portion and a metallic portion.

20. The composite tubing of claim 19 wherein said metallic portion is in contact heat transfer relationship with said line means.

21. The composite tubing of claim 1 having a filler disposed in contact relationship with said line means.

22. The composite tubing of claim 7 having a barrier member disposed between said thermal barrier and said outer protective covering and encompassing said thermal barrier.

23. The composite tubing of claim 22 wherein said barrier member comprises a metallic material.

24. The composite tubing of claim 22 wherein said barrier member comprises a polymeric material.

25. The composite tubing of claim 22 wherein said barrier member comprises a fibrous material.

26. The composite tubing of claim 22 wherein said barrier member comprises a laminate having a polymeric portion and a metallic portion.

27. The composite tubing of claim 9 wherein said tubular polymeric fluid conveyance line means has a reinforcement layer disposed in encompassing relationship about its outer surface.

28. The composite tubing of claim 27 wherein said reinforcement layer comprises a fibrous material.

29. The composite tubing of claim 27 wherein said reinforcement layer comprises a metallic material.

30. The composite tubing of claim 2 having means for providing a spaced-apart relationship between said tubular fluid conveyance line means and said heating line means.

31. The composite tubing of claim 30 wherein said means comprises a heat insulating means disposed in encompassing relationship about at least one of said tubular fluid conveyance line means.

32. The composite tubing of claim 30 wherein said means comprises a heat insulating means disposed in encompassing relationship about at least one of said heating line means.

33. The composite tubing of claim 30 wherein said means comprises a heat insulating means disposed in encompassing relationship about at least one of said tubular fluid conveyance line means and about at least one of said heating line means.

34. The composite tubing of claim 1 wherein one or more of the said sheet-like layers of fibrous glass elements have an undulated surface facing radially inwardly towards the central longitudal axis of the composite tubing and an undulated surface facing radially outwardly from the central longitudinal axis of the composite tubing.

* * * * *